Dec. 15, 1936.　　　G. A. TINNERMAN　　　2,064,092
SPRING FASTENER
Filed July 31, 1936

INVENTOR.
GEORGE A. TINNERMAN
BY Bates, Golrick & Teare
ATTORNEYS

Patented Dec. 15, 1936

2,064,092

UNITED STATES PATENT OFFICE 2,064,092

SPRING FASTENER

George A. Tinnerman, Rocky River, Ohio, assignor to Albert H. Tinnerman, Cleveland, Ohio Application July 31, 1936, Serial No. 93,680

2 Claims. (Cl. 85—36)

This invention relates to improvements in spring fasteners, and more particularly to those having yielding tongues which are adapted to engage a thread on the shank of a bolt and effect a locking action therewith.

Spring fasteners of the type referred to have been found to be very satisfactory as a means of retaining bolts in position through the coaction therewith of flexible members which extend from the fastener base portion, and which are drawn into or against the thread of the bolt, as the latter is positioned in the work.

A characteristic of this type of fastener has been the necessity of providing a comparatively large bearing area for the same adjacent the bolt hole, in order to provide sufficient metal to insure the requisite strength where the upstanding members merge with the body portion of the fastener. Heretofore, this requirement has prevented the use of spring-tongue fastening devices in corners and other places where very little room is provided adjacent the bolt hole.

An object of the present invention is to so make a spring fastener that it possesses adequate strength to assure its intended purpose, and at the same time to fit into locations which heretofore have been regarded as too small for the use of spring fasteners.

Figure 1:
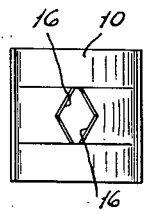
Figure 3:
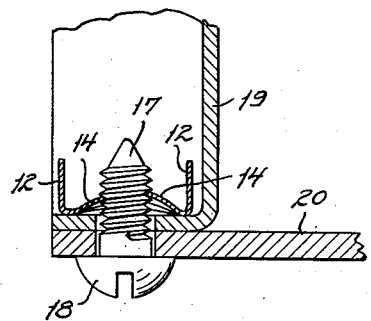
Figure 2:
Figure 4:
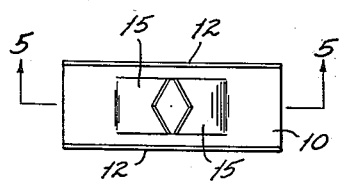
Figure 6:
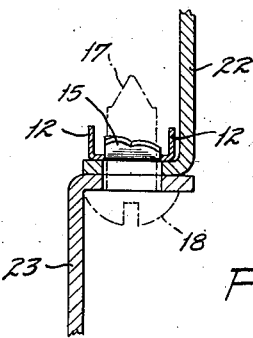
Figures 7, 8:
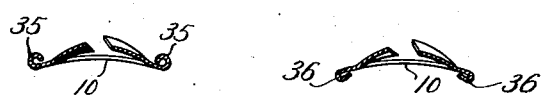
Figure 5:
Figure 9:
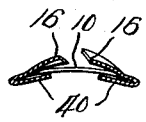

In the drawing, Figs. 1 and 2 show a plan and an elevation respectively of one form of my improved fastening device; Fig. 3 is a section bisecting the tongues of the fastener, showing the same cooperating with a bolt to retain two parts together; Fig. 4 is a plan view of a second form of my improved fastening device, showing the flanges located at right angles to the position occupied by the flanges in the fastener of Fig. 1; Fig. 5 is a transverse section of the fastening device shown in Fig. 4, as shown by the line 505 thereof; Fig. 6 is a section showing two portions fastened together with the aid of the device of Fig. 4, and showing the fastener in section crosswise adjacent the center thereof, and Figs. 7, 8, and 9 are vertical sections taken longitudinally through fasteners which embody modifications of my invention.

The fastening device shown in Figs. 1 to 3 comprises a body portion 10, provided at each end thereof with upstanding flanges 12, extending the full width of the body. A pair of oppositely facing spring tongues may be cut from the body portion 10 and curved outwardly, as shown in Fig. 2. The tongues each terminate in an inwardly opening seat 16 adapted to engage the thread 17 of a bolt 18 (Fig. 3). Each of the tongues may be twisted as shown in Figs. 2, 3, and 6 to provide a helical gripping surface for a threaded bolt.

As shown in Fig. 3, when the fastening device is in place on the bolt, the body 10 cooperates with the bolt head to secure any two members 19 and 20 together. The fastener device just described comprises a substantially square body and is very advantageously employed at corners, and in other positions where more than one upstanding body portion is located adjacent the bolt hole.

It is frequently desirable where the space between a bolt hole and an upstanding projection is very limited to use a spring fastener with the upstanding flanged portions extending parallel with the tongue members 15 as shown in Fig. 4. This construction may also be employed when it is desired to maintain the body portion substantially flat, and yet utilize the tongues with the helical bolt engaging edges shown in Fig. 5. A fastener having the flanges in the position thus described permits the use of bolt holes, which are spaced much closer to an upstanding wall than is the case with the device of Figs. 1 to 3. A fastener device of this type may secure two members 22 and 23 together, as shown in Fig. 6, where the proximity of the vertical portion of the member 22 to the bolt hole does not permit the use of other types of fasteners.

Figs. 7 and 8 are modifications of my invention wherein the fastener has bolt engaging tongues, as heretofore described, but in which each end of the body adjacent the base of each tongue is rolled inwardly. In Fig. 7 the rolled portions extend upwardly as indicated at 35, while in Fig. 8 they extend downwardly as shown at 36. The rolled portions provide beads which terminate adjacent the points where the tongues are united to the body. In practice, the beads extend entirely across the body portion and reinforce it notwithstanding the fact that the over-all length of the fasteners is reduced.

The modification of Fig. 9 comprises an abutment by means of which the tongues are prevented from being pulled through the aperture in case the bolt is turned too far during the tightening operation. Such abutments are indicated at 40 as terminating short of the re-entrant portions 16 so that they will clear the threads of a bolt that is inserted therethrough. The abutments are preferably the same width as the body of the fastener and as shown they terminate at points spaced inwardly from the base of each tongue. Inasmuch as the bottom of the abutments engage the work, it is obvious that as the tongues are pulled downwardly the downward movement is resisted as soon as the tongues engage the abutments.

From the foregoing description, it will be seen that I have provided a novel spring fastener which requires the minimum of space for successful use, and which at the same time is reinforced to eliminate undesirable flexing when the bolt is tightened therein.

I claim:

1. A fastening means for securing a threaded shank or the like in apertured work, comprising a device formed of a section of sheet material of a thickness relatively thin with respect to the cross section of said threaded shank, means extruded from said section for engaging said threaded shank in the manner of a nut and means integral with said section and bent out of the plane thereof for providing means engageable by a suitable tool for advancing said section on the said shank to a position substantially flush against the adjacent face of the work.

2. A fastening device for securing a threaded shank or the like in apertured work, comprising a device formed of a sheet section of a thickness relatively thin with respect to the cross section of said threaded shank, integral yieldable means deformed from the plane of said section for engaging said threaded shank in the manner of a nut, and elements integral with said section and bent out of the plane thereof presenting means which may be engaged to advance said relatively thin section on the said shank to a position substantially flush against the adjacent face of the work.

GEORGE A. TINNERMAN.